US009244556B2

(12) United States Patent
Ashikawa (10) Patent No.: US 9,244,556 B2
(45) Date of Patent: Jan. 26, 2016

(54) DISPLAY APPARATUS, DISPLAY METHOD, AND PROGRAM (75) Inventor: Shigeru Ashikawa, Kanagawa (JP)

(73) Assignee: NEC Corporation, Tokyo (JP)

( * ) Notice: Subject to any disclaimer, the term of this patent is extended or adjusted under 35 U.S.C. 154(b) by 20 days.

(21) Appl. No.: 14/346,881

(22) PCT Filed: Aug. 22, 2012

(86) PCT No.: PCT/JP2012/071176
§ 371 (c)(1),
(2), (4) Date: Mar. 24, 2014

(87) PCT Pub. No.: WO2013/047023
PCT Pub. Date: Apr. 4, 2013

(65) Prior Publication Data
US 2014/0225854 A1    Aug. 14, 2014

(30) Foreign Application Priority Data
Sep. 26, 2011    (JP) .................................. 2011-208821

(51) Int. Cl.
G06F 3/041    (2006.01)
G06F 3/0488    (2013.01)

(52) U.S. Cl.
CPC .............. G06F 3/041 (2013.01); G06F 3/0416 (2013.01); G06F 3/0488 (2013.01)

(58) Field of Classification Search
CPC ............ G06F 3/04842; G06F 3/04812; G06F 3/0481; G06F 3/038; G06F 3/0482; G06F 3/044; G06F 3/041; G06F 3/0488; G06F 3/0416
See application file for complete search history.

(56) References Cited

U.S. PATENT DOCUMENTS

| 6,590,568 | B1 | 7/2003 | Astala et al. | |
| 2006/0161846 | A1* | 7/2006 | Van Leeuwen | 715/702 |
| 2006/0244735 | A1* | 11/2006 | Wilson | 345/173 |
| 2007/0300182 | A1* | 12/2007 | Bilow | 715/799 |
| 2008/0215980 | A1 | 9/2008 | Lee et al. | |
| 2008/0256472 | A1 | 10/2008 | Kim et al. | |
| 2009/0058821 | A1 | 3/2009 | Chaudhri et al. | |
| 2009/0160809 | A1 | 6/2009 | Yang et al. | |
| 2009/0228820 | A1 | 9/2009 | Kim et al. | |

(Continued)

FOREIGN PATENT DOCUMENTS

EP    2189887 A2    5/2010
EP    2202626 A2    6/2010

(Continued)

OTHER PUBLICATIONS

International Search Report corresponding to PCT/JP2012/071176, dated Oct. 30, 2012; 1 page.

(Continued)

Primary Examiner — Lun-Yi Lao
Assistant Examiner — Md Saiful A Siddiqui
(74) Attorney, Agent, or Firm — Wilmer Cutler Pickering Hale and Dorr LLP (57) ABSTRACT A display apparatus (1) according to the present invention has display means (3) that detects contact and proximity of operating means with respect to a display range of the display means, and control means (5) that determines a position where an item designated by contact is to be displayed, based on the position of contact and the position of proximity which are detected by the display means (3).

4 Claims, 8 Drawing Sheets (56) References Cited

U.S. PATENT DOCUMENTS

| | | |
|---|---|---|
| 2010/0115405 A1 | 5/2010 | Chang et al. |
| 2010/0169834 A1 | 7/2010 | Wakizaka et al. |
| 2010/0257473 A1 | 10/2010 | Kang |
| 2011/0043489 A1 | 2/2011 | Yoshimoto et al. |
| 2014/0040822 A1 | 2/2014 | Yang et al. |
| 2014/0237360 A1 | 8/2014 | Chaudhri et al. |
| 2015/0012853 A1 | 1/2015 | Chaudhri et al. |

FOREIGN PATENT DOCUMENTS

| | | |
|---|---|---|
| EP | 2282254 A1 | 2/2011 |
| JP | 2008-226282 | 9/2008 |
| JP | 2010-152827 | 7/2010 |
| JP | 2010-287032 | 12/2010 |
| JP | 2011-028560 | 2/2011 |
| WO | WO2009/139214 | 11/2009 |

OTHER PUBLICATIONS

Extended European Search Report issued by the European Patent Office for Application No. 12836876.8 dated Jul. 7, 2015 (10 pages).

* cited by examiner

DISPLAY APPARATUS, DISPLAY METHOD, AND PROGRAM

CROSS-REFERENCE TO RELATED APPLICATIONS

This application is a national stage application of International Application No. PCT/JP2012/071176 entitled "Display Apparatus, Display Method, and Program," filed on Aug. 22, 2012, which claims the benefit of the priority of Japanese Patent Application No. 2011-208821, filed on Sep. 26, 2011, the disclosures of each of which are hereby incorporated by reference in their entirety.

TECHNICAL FIELD

The present invention relates to a display apparatus, a display method, and a program to be executed by a computer.

BACKGROUND ART

Recent years have seen many touchscreens having a display unit with added input functions, incorporated in information processing terminals. An information processing terminal that incorporates a touchscreen displays buttons that describe names of items on the screen. When the user touches a button with a finger, a command representing the name of item that corresponds to the touched button is entered into the information processing terminal.

When the user selects a button displayed on the screen, the finger of the user may hide the name of item displayed on the button. Even if the name of item is hidden, no significant problem is posed when the user is entering commands in succession or when the user has sufficiently confirmed the name of item before selecting the item. However, when the user is not experienced enough to operate the touchscreen or has taken its eyes off the display unit immediately before operating the touchscreen, if the user's finger has hidden the name of item, then the user may feel anxious because the user may not be sure what it has selected. The user may make an attempt to stop himself/herself from feeling anxious by wastefully redoing the action on the touchscreen, e.g., canceling the item that the user has selected. Alternatively, the user may let the uncertainly selected item be executed, possibly performing a function that he/she did not intend.

One method of alleviating the above shortcoming or allowing the user to take reliable actions may be to increase display areas to be touched and reduce areas that are hidden by the finger for better visibility. However, since the screen of information processing terminals is limited in size, increased display areas (areas to be touched) are disadvantageous in that they tend to reduce the amount of information which can be displayed on the screen.

More and more mobile phones have been using touchscreens, as typified by smartphones. Of the mobile phones, those other than smartphones are required at all times to have a smaller casing and are more limited in screen size than the smartphones. The mobile phones tend to incorporate an increased number of functions, and the number of items that can be selected on the mobile phones also tends to increase accordingly.

The increased number of selectable options due to the increased number of functions may be resolved by displaying more selectable options on the screen. However, displaying many selectable options on a screen of limited size requires that the selectable options have smaller display areas, which results in a disadvantage in that they are likely to be hidden by the finger.

An example of display method for solving the above problem is disclosed in Patent document 1. Patent document 1 reveals that of a plurality of image keys displayed on a touch screen, the name of item of the image key to which the user's finger has moved most closely is displayed in a speech balloon near the image key. Even if the name of item of the image key is hidden by the user's finger, the user is able to recognize to which image key the user's finger is closest.

PRIOR TECHNICAL DOCUMENTS

Patent Document

Patent document 1: JP2010-152827A (FIG. 5)

SUMMARY OF THE INVENTION

According to the display method disclosed in Patent document 1, the user's finger or hand may obstruct the displayed speech balloon depending on how the user takes an action, e.g., whether the user uses the right hand or the left hand to take an action. This problem will be described below with reference to FIG. 1 of the accompanying drawings.

Figure 1:
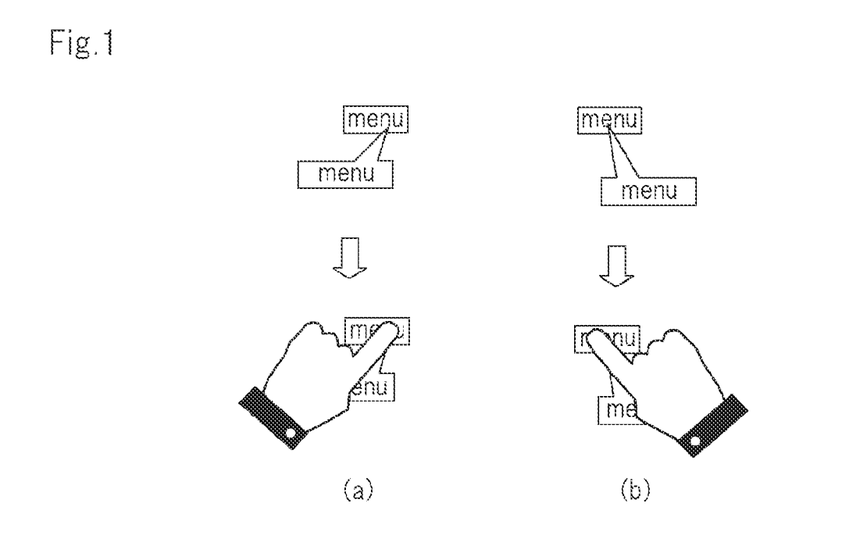
FIG. 1 is a view showing situations where a user's finger or hand obstructs a displayed speech balloon depending on how an information processing terminal is operated.

As shown in an upper portion of FIG. 1(a), when an item having the name "MENU" is displayed in a speech balloon obliquely leftwardly and downwardly of the item, no problem arises if the user operates the touchscreen with the right hand. However, if the user operates the touchscreen with the left hand as shown in a lower portion of FIG. 1(a), then the user's finger obstructs the displayed speech balloon. Conversely, as shown in an upper portion of FIG. 1(b), when the item having the name "MENU" is displayed in a speech balloon obliquely rightwardly and downwardly of the item, no problem arises if the user operates the touchscreen with the left hand. However, if the user operates the touchscreen with the right hand as shown in a lower portion of FIG. 1(b), then the user's finger obstructs the displayed speech balloon.

Even if the user can operate the information processing terminal to set a direction in which to display a speech balloon, the user needs to change the settings each time he/she changes the hand with which to operate the information processing terminal easily, and hence finds it tedious and time-consuming to change the settings.

An exemplary object of the invention is to provide a display apparatus, a display method, and a program to be executed by a computer, which make it possible to increase the visibility of an item that tends to be hidden by a finger when it is to be selected.

A display apparatus according to an exemplary aspect of the invention includes display means detecting contact and proximity of operating means with respect to a display range of the display means, and control means determining a position where an item designated by contact is to be displayed, based on the position of contact and the position of proximity which are detected by the display means.

A display method according to an exemplary aspect of the invention, to be carried out by a display apparatus, includes detecting contact and proximity of operating means with respect to a display range, and determining a position where an item designated by contact is to be displayed, based on the position of contact and the position of proximity which are detected.

A program according to an exemplary aspect of the invention is a program for enabling the computer to carry out a procedure for receiving contact and proximity of operating means with respect to a display range from display means, and a procedure for determining a position where an item designated by contact is to be displayed, based on the position of contact and the position of proximity which are detected by the display means.

MODE FOR CARRYING OUT THE INVENTION

The configurations of exemplary embodiments of the present invention will be described below.

Figure 2:
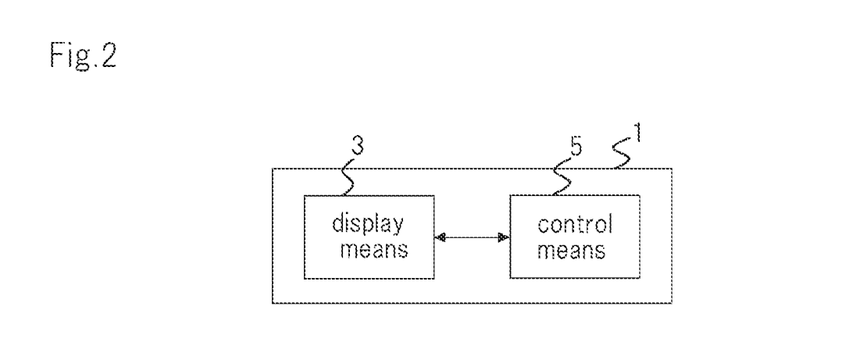
FIG. 2 is a block diagram of a configurational example of a display apparatus according to an exemplary embodiment of the present invention.

FIG. 2 is a block diagram of a configurational example of a display apparatus according to an exemplary embodiment of the present invention.

As shown in FIG. 2, display apparatus 1 has display means 3 and control means 5. Display means 3 detects contact and proximity of operating means with respect to a display range thereof. The operating means determines a position where an item indicated by contact is to be displayed, based on the position of contact and the position of proximity detected by display means 3. The position of contact and the position of proximity are different from each other in the display range of display means 3.

A display apparatus according to exemplary embodiments of the present invention will be described in detail below. According to the exemplary embodiments, the display apparatus will be described as being incorporated in mobile phones including smartphones. However, the display apparatus may be incorporated in mobile terminals including not only mobile phones, but also PDAs (Personal Digital Assistants), electronic books, and portable game machines. The display apparatus according to the present invention may be incorporated in desktop personal computers (hereinafter referred to as "PC") or notebook PCs.

(First Exemplary Embodiment)

Figure 3:
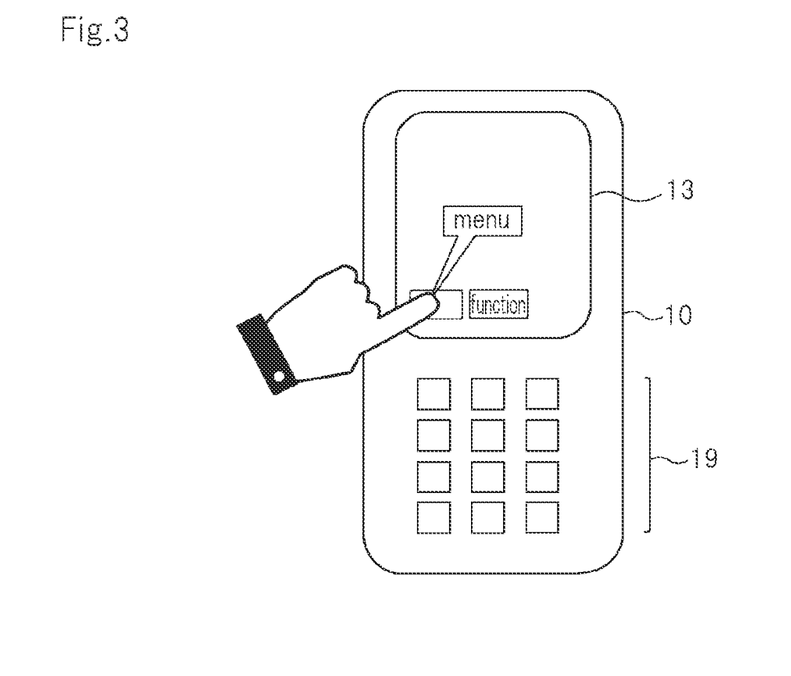
FIG. 3 is a view showing by way of example a mobile phone according to a first exemplary embodiment of the present invention.

The configuration of a mobile phone according to the present exemplary embodiment will be described below. FIG. 3 is a view showing by way of example a mobile phone according to a first exemplary embodiment of the present invention, and FIG. 4 is a block diagram of a configurational example of the mobile phone according to the first exemplary embodiment of the present invention.

According to the present exemplary embodiment, configurational details about a display method according to the present invention will be described, and any description of configurational details and operation thereof about general functions of the mobile phone will be omitted.

Figure 4:
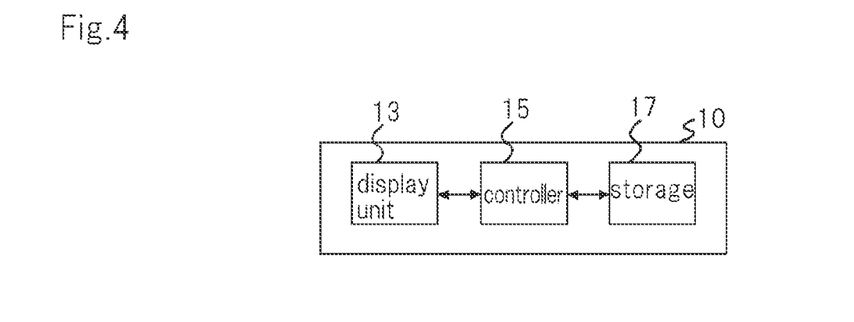
FIG. 4 is a block diagram of a configurational example of the mobile phone according to the first exemplary embodiment of the present invention.

As shown in FIG. 4, mobile phone 10 according to the present embodiment has display unit 13 having a touchscreen, storage unit 17 for storing information to be displayed by display unit 13, and controller 15 for controlling display unit 13 and storage 17. The touchscreen may be of the electrostatic capacitance type, for example. Controller 15 has a CPU (Central Processing Unit), not shown, for performing operation sequences according to a program and a memory, not shown, for storing the program.

FIG. 3 shows by way of example a displayed speech balloon describing the name of an item "MENU" that has been selected by the user. Mobile phone 10 is shown in FIG. 3 as having key pad 19 including a plurality of keys as a means for entering commands from the user, in addition to the touchscreen of display unit 13. However, mobile phone 10 may have the functions of key pad 19 performed by the touchscreen of display unit 13.

Display unit 13 has a display range with xy coordinates preset therein. When display unit 13 detects contact by the user's finger, it sends contact point coordinate information representing the coordinates of a position where the contact is detected, to controller 15. At this time, display unit 13 checks whether or not there is proximity other than the contact. If display unit 13 detects proximity by part of the user's hand (hereinafter referred to as "finger"), it sends proximity point coordinate information representing the coordinates of a position where the proximity is detected, together with the contact point coordinate information, to controller 15. Display unit 13 can detect proximity within a distance in the range from 1 to 2 cm from the surface of display unit 13. The position where contact is detected will hereinafter be referred to as "contact point", and the position where proximity is detected as "proximity point".

Figure 5:
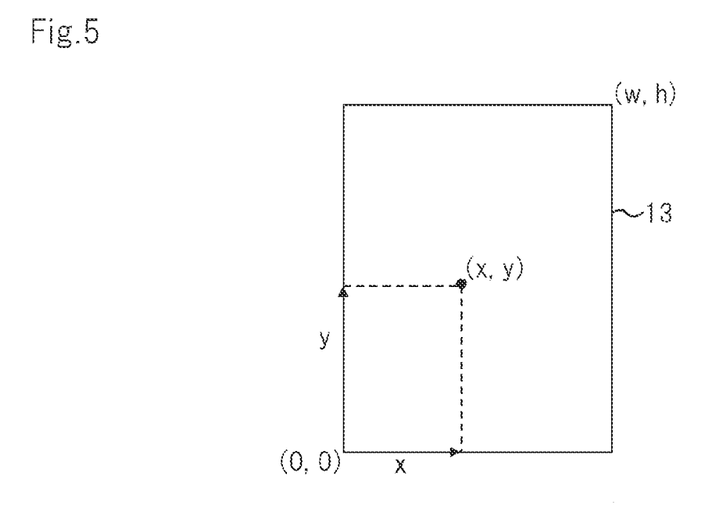
FIG. 5 is a view showing by way of example xy coordinates set in the display range of a display unit shown in FIG. 4.

FIG. 5 is a view showing by way of example xy coordinates set in the display range of the display unit. The xy coordinates shown in FIG. 5 belong to an xy coordinate system having its origin at the lower left corner of the display range. However, the origin of the xy coordinate system is not limited to the illustrated origin. The display range shown in FIG. 5 has a maximum value w in the x-axis direction and a maximum value h in the y-axis direction.

Storage unit 17 stores input screen information representing image data of an input screen for the user to enter commands and information about xy coordinates of ranges to be displayed about a plurality of items that are selectively displayed on the input screen and names of items.

Controller 15 has a memory, not shown, that stores a table for determining the positions of displayed speech balloons, the table containing information about xy coordinates set to the display range of display unit 13 and information about items to be selected by the user.

When a command for calling the input screen is supplied to controller 15, controller 15 reads the input screen information from storage unit 17, and controls display unit 13 to display the input screen according to the input screen information. When controller 15 receives contact point coordinate information and proximity point coordinate information from display unit 13, controller 15 determines the position of a displayed speech balloon for the name of an item that is selected at the contact point, based on the contact point coordinate information and the proximity point coordinate information.

Figure 6A:
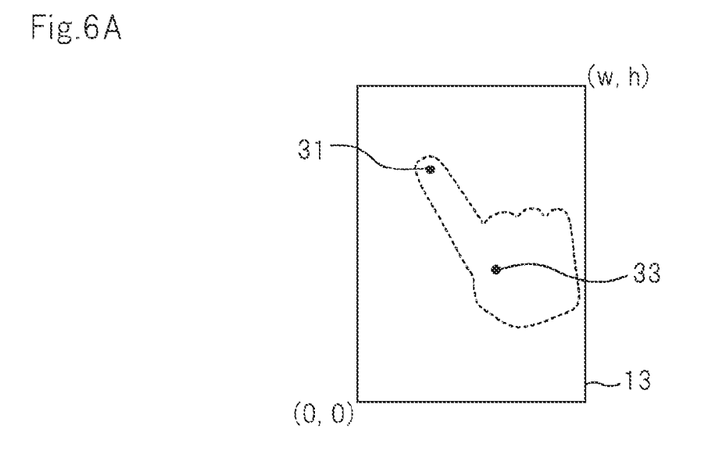
FIG. 6A is a view illustrating a process of determining the position of a displayed speech balloon.
Figure 6B:
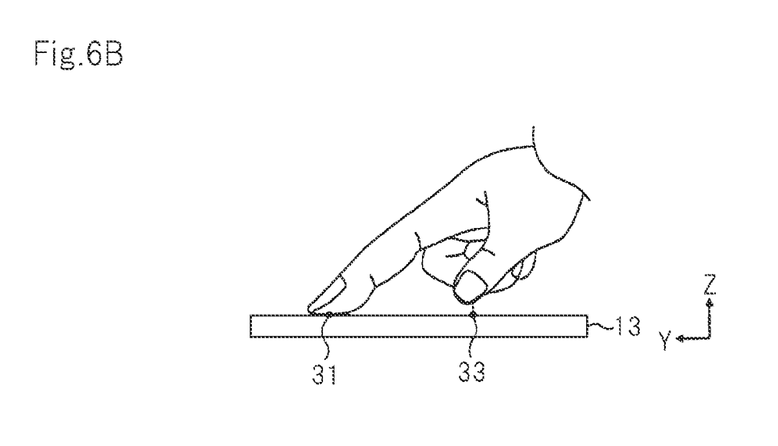
FIG. 6B is a view illustrating the process of determining the position of a displayed speech balloon.
Figure 6C:
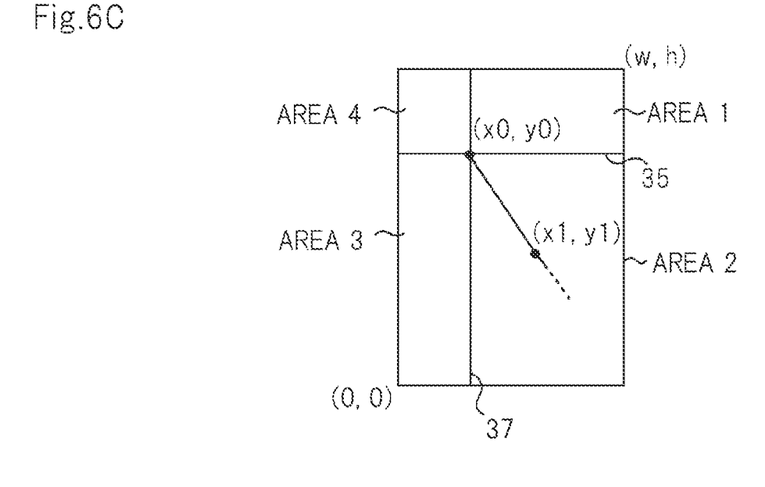
FIG. 6C is a view illustrating the process of determining the position of a displayed speech balloon.

A specific example of a process of determining the position of a displayed speech balloon will be described below. FIGS. 6A through 6C are views illustrating the process of determining the position of a displayed speech balloon. FIG. 6A is a plan view showing the manner in which the user selects a name of an item displayed on the display unit, with a finger. FIG. 6B is a side elevational view illustrating the manner shown in FIG. 6A. FIG. 6C is view showing the coordinates of the contact point and the proximity point of the user's finger.

First, a process performed by controller 15 for judging the direction in which the user's finger obstructs the display, i.e., the direction of the user's finger serving as an operating means, will be described below.

As shown in FIGS. 6A and 6B, when the user has brought its index finger into contact with display unit 13, the thumb is brought into proximity with display unit 13. The contact by the index finger and the proximity by the thumb are detected by display unit 13, and controller 15 receives, from display unit 13, contact point coordinate information and proximity point coordinate information representing the coordinates of contact point 31 and proximity point 33. As shown in FIG. 6C, controller 15 identifies the coordinates of contact point 31 as (X0, Y0) and also identifies the coordinates of proximity point 33 as (X1, Y1). Then, controller 15 judges the direction of a straight line segment that originates from the coordinates (X0, Y0) of contact point 31 and passes through the coordinates (X1, Y1) of proximity point 33, as the direction of the operating means. Controller 15 judges the direction in which the finger obstructs the display, and changes the direction of a displayed speech balloon based on the judged direction, so that the speech balloon will be displayed in a direction not hidden by the finger.

A specific example of a process for determining the position of a displayed speech balloon in an area other than the direction of the operating means within the display range of display unit 13 after controller 15 has determined the direction of the operating means, will be described below. Table 1 below represents an example of a table that is stored in the memory, not shown, of controller 15.

TABLE 1

| Judging standard: x-axis | — | Judging standard: y-axis | ⇨ | Non-displayable area | Displayable area |
| --- | --- | --- | --- | --- | --- |
| X0 < X1 | AND | Y0 < Y1 | ⇨ | AREA 1 | AREAS 2, 3, 4 |
| X0 < X1 | AND | Y0 > Y1 | ⇨ | AREA 2 | AREAS 1, 3, 4 |
| X0 > X1 | AND | Y0 > Y1 | ⇨ | AREA 3 | AREAS 1, 2, 4 |
| X0 > X1 | AND | Y0 < Y1 | ⇨ | AREA 4 | AREAS 1, 2, 3 |

Controller 15 establishes division line 35 that passes through the coordinates of contact point 31 parallel to the x-axis and division line 37 that passes through the coordinates of contact point 31 parallel to the y-axis, in the xy coordinate system, dividing the display range into four subranges that are represented respectively by AREAS 1 through 4, respectively, in FIG. 6C. Then, controller 15 refers to the table shown as Table 1 above, determines one of AREAS 1 through 4 which includes proximity point 33 as a non-displayable area, and determines the position where the information of the selected item is to be displayed from the areas that do not include proximity point 33.

In the example shown in FIG. 6C, since X0<X1 and Y0>Y1, the non-displayable area is AREA 2 from Table 1, and the displayable area is any one of AREAS 1, 3, and 4.

When the user has its index finger brought into contact with display unit 13, display unit 13 may possibly detect proximity by a medicinal finger or a little finger of the user in addition to the index finger. If display unit 13 detects proximity by a plurality of fingers, then controller 15 may perform the above process on the respective proximity points based on the contact point to determine non-displayable areas. If there are a plurality of non-displayable areas corresponding to the proximity points, then controller 15 may exclude the newly added non-displayable areas from the initially judged displayable areas, and display a speech balloon in a remaining displayable area.

According to a process for dealing with a plurality of displayable areas, a priority sequence for display areas may be preset as a default setting, and controller 15 may display a speech balloon in one of the display areas that has the highest priority according to the priority sequence. In this case, information about the priority sequence is described in the table recorded in the memory of controller 15. In Table 1, with respect to each of the non-displayable areas AREAS 1 through 4, the order of the AREAS stated in the column "Displayable area" represents a priority sequence with the priority being higher to the left. If the non-displayable area is AREA 1, then the area with the highest priority for display is AREA 2.

Figure 7:
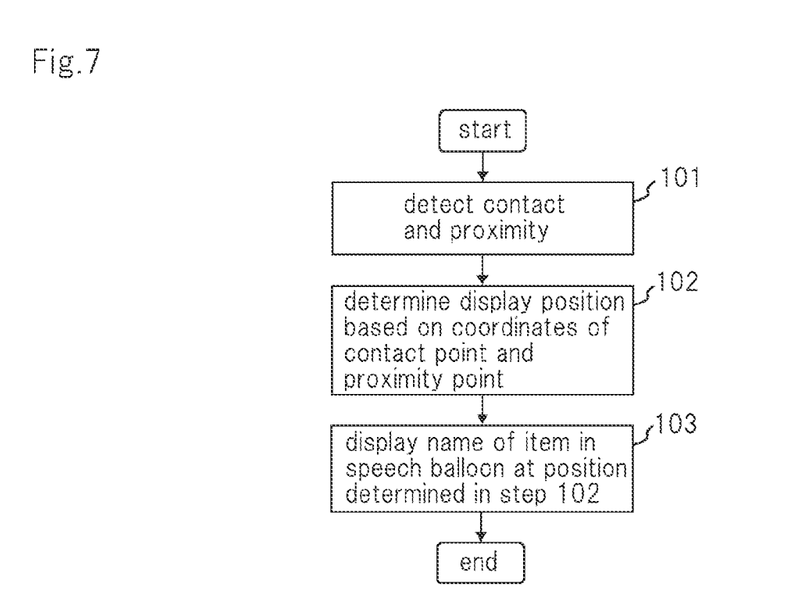
FIG. 7 is a flowchart of an operation sequence of the mobile phone according to the first exemplary embodiment of the present invention.
Figure 8:
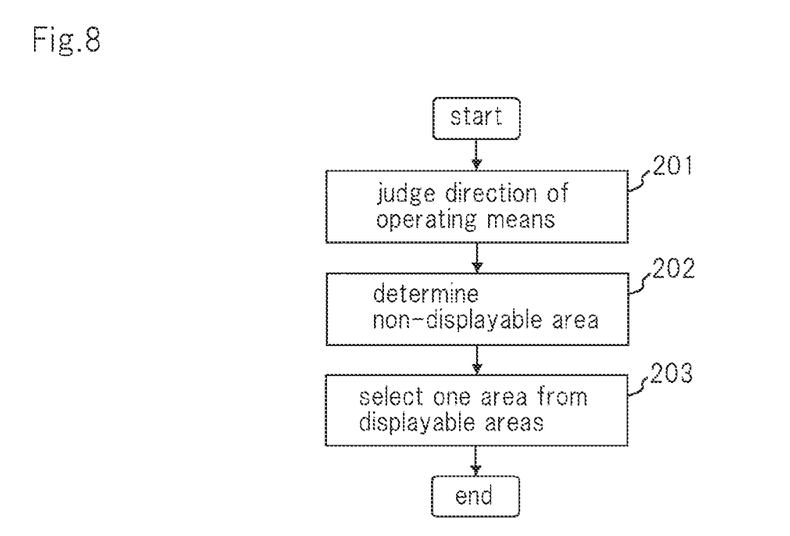
FIG. 8 is a flowchart of a specific example of step 102 shown in FIG. 7.

Operation of mobile phone 10 according to the present exemplary embodiment will be described below. FIG. 7 is a flowchart of an operation sequence of the mobile phone according to the present exemplary embodiment. FIG. 8 is a flowchart of a process for determining a display position. It is assumed that the input screen is initially displayed on display unit 13.

If display unit 13 detects contact and proximity by the user's finger (step 101), then it sends contact point coordinate information and proximity point coordinate information to controller 15. When controller 15 receives the contact point coordinate information and the proximity point coordinate information from display unit 13, controller 15 refers to the input screen information, identifies an item selected by the user from the contact point coordinate information, and determines a display position for the name of item of the identified item, based on the contact point coordinate information and the proximity point coordinate information (step 102). Then, controller 15 controls display unit 13 to display a speech balloon of the name of item at the position determined in step 102 (step 103).

A specific example of step 102 will be described below with reference to the flowchart shown in FIG. 8.

Controller 15 identifies the coordinates of the contact point as (X0, Y0) and the coordinates of the proximity point as (X1, Y1). Then, controller 15 judges the direction of a straight line segment that originates from the coordinates (X0, Y0) of the contact point and passes through the coordinates (X1, Y1) of the proximity point, as the direction of the operating means (step 201).

Controller 15 establishes a division line that passes through the coordinates of contact point 31 parallel to the x-axis and a division line that passes through the coordinates of contact point 31 parallel to the y-axis, in the xy coordinate system, dividing the display range into four subranges (AREAS 1 through 4 in FIG. 6C). Then, controller 15 refers to the table shown as Table 1 above, determines one of AREAS 1 through 4 which includes the direction of the operating means judged in step 201, i.e., the proximity point, as a non-displayable area (step 202), and determines a position where the information of the selected item is to be displayed from the areas that do not include the proximity point according to the preset priority sequence (step 203).

FIGS. 9A through 9D are views showing by way of example speech balloon displaying processes performed in step 103 by controller 15. The x-axis and the y-axis shown in FIGS. 9A through 9D correspond to those of the xy coordinate system shown in FIG. 5.

Figure 9A:
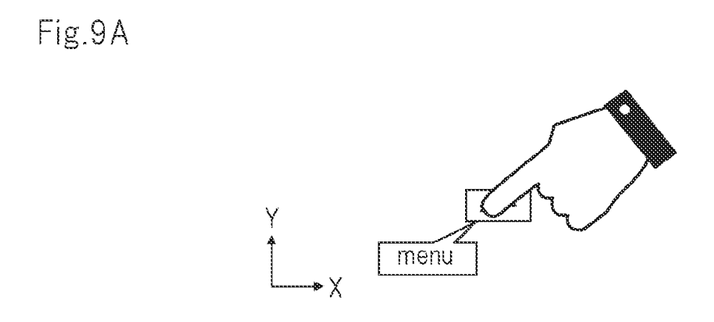
FIG. 9A is a view showing by way of example a speech balloon displaying process.
Figure 9B:
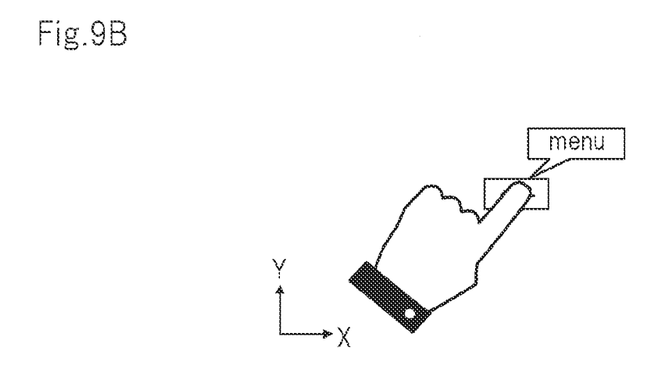
FIG. 9B is a view showing by way of example a speech balloon displaying process.
Figure 9C:
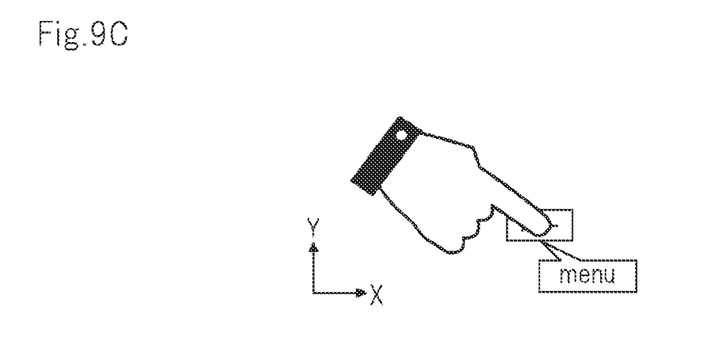
FIG. 9C is a view showing by way of example a speech balloon displaying process.
Figure 9D:
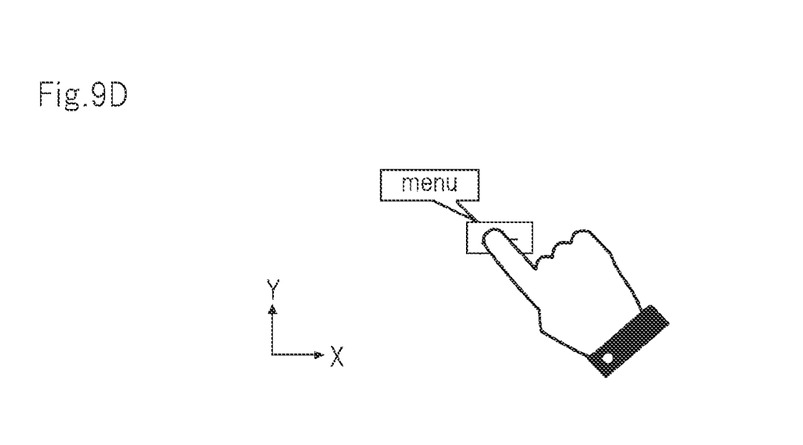
FIG. 9D is a view showing by way of example a speech balloon displaying process.

FIG. 9A illustrates a speech balloon displaying process wherein AREA 1 is judged as the non-displayable area and the speech balloon of the item having the name "MENU" is displayed in AREA 3. FIG. 9B illustrates a speech balloon displaying process wherein AREA 3 is judged as the non-displayable area and the speech balloon of the item having the name "MENU" is displayed in AREA 1. FIG. 9C illustrates a speech balloon displaying process wherein AREA 4 is judged as the non-displayable area and the speech balloon of the item having the name "MENU" is displayed in AREA 2. FIG. 9C illustrates a speech balloon displaying process wherein AREA 2 is judged as the non-displayable area and the speech balloon of the item having the name "MENU" is displayed in AREA 4.

As shown in FIGS. 9A through 9D, when the user touches with its finger any one of a plurality of items that are displayed on display unit 13 as simulated keycaps, the name of the displayed item that is obstructed by the touching finger and cannot be confirmed by the user is displayed in a speech balloon at another position.

Objects displayed as speech balloons may represent the types of keys showing numerals and characters, or may be in the form of icons, characters, images, or the like that are displayed as selectable items such as a menu, etc. Only the name of an item that is being currently selected by the user is displayed in a speech balloon.

Figure 10:
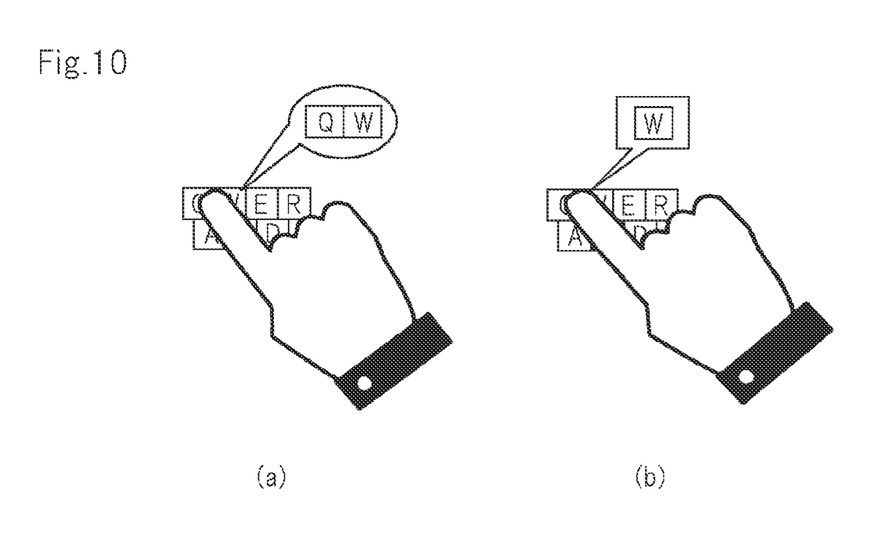
FIG. 10 is a view showing information, displayed in an enlarged scale, of selected items.

In the above exemplary embodiment, the name of an item selected by the user is displayed in a speech balloon. However, the name of an item selected by the user may be displayed in a format other than the speech balloon. For example, it may be displayed in an enlarged scale. FIG. 10 is a view showing information, displayed in an enlarged scale, of selected items.

As shown in FIG. 10(a), if a displayed item is simply displayed in an enlarged scale, then a plurality of selectable options may possibly be displayed. In FIG. 10(a), the user is unable to judge a selectable option that is effective as an input. According to the present embodiment, unlike a selectable option to be displayed simply in an enlarged scale, an item that can be entered by the user is displayed in a speech balloon when touched, as shown in FIG. 10(b). The process shown in FIG. 10(b) allows the user to recognize an item that is selected by touching it.

Figure 11:
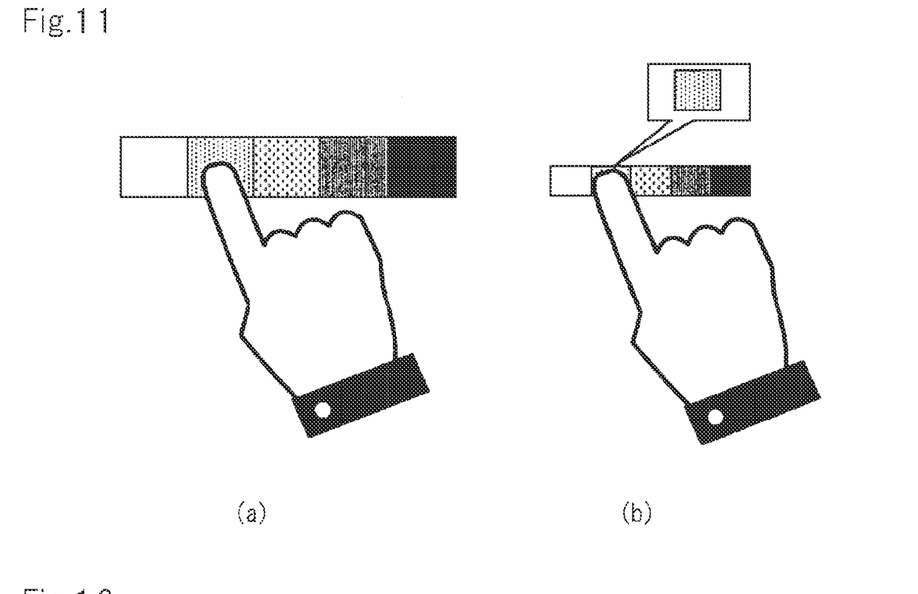
FIG. 11 is a view showing by way of example information, which is other than names of items, displayed in a speech balloon.

In the above exemplary embodiment, the information of an item that is selected by the user represents "name of item". However, an item that is selected by the user may represent "color". FIG. 11 is a view showing by way of example information, which is other than names of items, displayed in a speech balloon.

When the user selects a color, a display area needs to be larger than necessary as shown in FIG. 11(a) in order for the user to understand which color the user is selecting. According to the present embodiment, as shown in FIG. 11(b), a color that is being currently selected by the user is displayed in a speech balloon. The user is thus able to confirm the selected color without the need for making the display area larger than necessary as shown in FIG. 11(a).

According to the present exemplary embodiment, a position where the user's finger is brought into contact with the touchscreen of the display unit and a position where the user's finger or hand is brought into proximity with the touchscreen are detected to determine the direction (area) in which a displayed speech balloon is obstructed by the hand, and a speech balloon of a selected item is displayed in a direction that is not obstructed by the user's own hand. Therefore, the user is able to confirm the item selected by himself/herself with the displayed speech balloon. As a result, the visibility of an item that the user is going to select is increased.

Even if items that are displayed on the display unit so as to be selectable by the user are designed in a size small enough to be hidden by the user's finger when touched by the user, since the user can confirm which of the items is being selected, the items can be displayed in a more highly concentrated layout than heretofore while maintaining their visibility.

Inasmuch as contents of selectable items are displayed in a speech balloon, it is not necessary to set aside a fixed area for displaying the contents of the selectable items. As a result, the display method according to the present exemplary embodiment is applicable to apparatuses whose display screens are difficult to increase in size, such as mobile phones, and also to existing apparatuses whose screen designs do not take into account touch operations without greatly changing the screen design itself.

Furthermore, the user is not required to operate the mobile phone to change settings as to the direction of a displayed speech balloon, and hence does not have to carry out a tedious and time-consuming process to change the settings.

(Second Exemplary Embodiment)

The present exemplary embodiment is different from the first exemplary embodiment as to the structure of the touchscreen of the display unit.

Configurational details of a mobile phone according to the present exemplary embodiment will be described below. According to the present exemplary embodiment, configurational details which are different from those of the first exemplary embodiment will mainly be described, and any description of the same configurational details as those of the first exemplary embodiment will be omitted.

Figure 12:
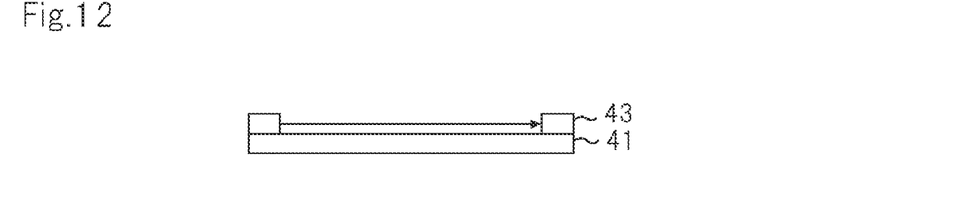
FIG. 12 is a side elevational view showing a configurational example of a touchscreen incorporated in a display unit according to a second exemplary embodiment of the present invention.

The mobile phone according to the present exemplary embodiment has a layered touchscreen, instead of an electrostatic capacitance touchscreen, incorporated in display unit 13 shown in FIG. 2. As shown in FIG. 12, the layered touchscreen comprises resistance film touchscreen (hereinafter referred to as "lower layer screen") 41 and optical touchscreen (hereinafter referred to as "upper layer screen") 43 disposed on lower layer screen 41. Upper layer screen 43 is of the infrared scanning type, for example. The arrow in FIG. 12 schematically represents an infrared radiation.

When lower layer screen 41 detects contact by the user's finger, it sends contact point coordinate information to controller 15. When upper layer screen 43 detects proximity by the user's finger, it sends proximity point coordinate information to controller 15.

Figure 13:
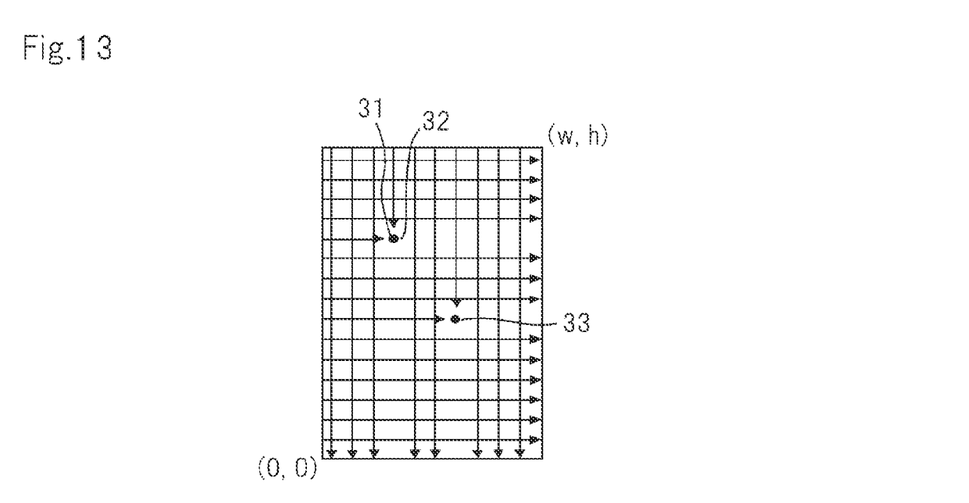
FIG. 13 is a view illustrating the detection of contact and proximity on the touchscreen of the display unit according to the second exemplary embodiment.

FIG. 13 is a plan view illustrating the manner in which lower layer screen 41 and upper layer screen 43 detect contact and proximity when the user has brought his/her index finger into contact with display unit 13 and his/her thumb into proximity with display unit 13, as with the process described above with reference to FIGS. 6A through 6C.

Upper layer screen 43 has a plurality of infrared radiation emitters disposed along one of two facing sides of a display range and a plurality of infrared radiation detectors disposed along the other side, in surrounding relation to the display area of lower layer screen 41. As shown in FIG. 13, when lower layer screen 41 detects contact point 31, it sends coordinate information of contact point 31 to controller 15. When upper layer screen 43 detects proximity point 32 and proximity point 33, it sends coordinate information of proximity points 32, 33 to controller 15. Controller 15 receives the coordinate information of contact point 31 from lower layer screen 41, and receives the coordinate information of proximity point 32 and proximity point 33 from upper layer screen 43. If controller 15 recognizes that the coordinate information of proximity point 32 agrees with the coordinate information of contact point 31 within a predetermined range, then controller 15 determines the position of a displayed speech balloon of the item selected by the user in the same manner as with the first exemplary embodiment, based on the coordinate information of contact point 31 and proximity point 33.

Operation of the mobile phone according to the present exemplary embodiment is the same as with the first exemplary embodiment except that controller 15 receives contact point coordinate information from lower layer screen 31 and receives proximity point coordinate information from upper layer screen 33, and hence will not be described in detail below.

The present exemplary embodiment offers the same advantages as with the first exemplary embodiment even if the operating means is not the user's finger but is a stylus such as a pen or the like. If a stylus is not used as the operating means, then an electrostatic capacitance touchscreen may be used instead of a resistance film touchscreen. The features described above with respect to the first exemplary embodiment, e.g., information displayed in an enlarged scale rather than in a speech balloon, are also applicable to the present exemplary embodiment.

The first and second exemplary embodiments have been described as applied to mobile phones. However, the display apparatus according to the present invention may be incorporated in the display unit of information processing terminals including a portable terminal such as a PDA or the like which has a touchscreen for entering/selecting information using a finger or a stylus, so that the display unit can display items in a highly concentrated layout while maintaining their visibility.

The present invention is not limited to a program for controlling a computer to carry out the display method according to the present invention, but may be concerned with a computer-readable recording medium storing the program therein.

According to one of the advantages of the present invention, the visibility of an item to be selected is increased.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2011-208821 filed on Sep. 26, 2011, the content of which is incorporated by reference.

DESCRIPTION OF REFERENCE CHARACTERS

1 display apparatus
3 display means
5 control means
10 mobile phone
13 display unit
15 controller

The invention claimed is:

1. A display apparatus comprising:
a display unit detecting contact and proximity of operating means with respect to a display range of the display unit; and
a controller determining a position where an item designated by contact is to be displayed, based on the position of contact and the position of proximity which are detected by said display unit,
wherein:
an xy coordinate system for identifying said position of contact and said position of proximity is established in the display range of said display unit;
said controller judges a direction of a straight line segment that originates from a contact point representing the position where the contact is detected and that passes through a proximity point representing the position where the proximity is detected, as the direction of said operating means in said xy coordinate system, and determines a position where said item is to be displayed in an area in a direction that originates from said contact point and that is different from the direction of said operating means; and
said controller establishes, in said xy coordinate system, a first division line passing through said contact point parallel to an x-axis of said xy coordinate system and a second division line passing through said contact point parallel to a y-axis of said xy coordinate system, thereby dividing said display range into four subranges, and determines the position where said item is to be displayed in one of said subranges which does not include said proximity point.

2. The display apparatus according to claim 1, wherein said controller displays said item in an enlarged scale or in a speech balloon at a position determined based on said point of contact and said position of proximity.

3. A display method to be carried out by a display apparatus, comprising:
detecting contact and proximity of operating means with respect to a display range; and determining a position where an item designated by contact is to be displayed, based on the position of contact and the position of proximity which are detected, wherein an xy coordinate system for identifying said position of contact and said position of proximity is established in the display range of said display unit, wherein, in a step of determining a position where said item is to be displayed:

a direction of a straight line segment that originates from a contact point representing the position where the contact is detected and that passes through a proximity point representing the position where the proximity is detected, is judged as the direction of said operating means in said xy coordinate system, and a position where said item is to be displayed in an area in a direction that originates from said contact point and that is different from the direction of said operating means is determined; and in said xy coordinate system, a first division line passing through said contact point parallel to an x-axis of said xy coordinate system and a second division line passing through said contact point parallel to a y-axis of said xy coordinate system, is established thereby dividing said display range into four subranges, and the position where said item is to be displayed in one of said subranges which does not include said proximity point is determined.

4. A non-transitory computer-readable data storage medium storing a program for enabling the computer to carry out:

a procedure for receiving contact and proximity of operating means with respect to a display range from a display unit; and a procedure for determining a position where an item designated by contact is to be displayed, based on the position of contact and the position of proximity which are detected by said display unit, wherein an xy coordinate system for identifying said position of contact and said position of proximity is established in the display range of said display unit, wherein, said procedure for determining a position where said item is to be displayed comprises:

judging a direction of a straight line segment that originates from a contact point representing the position where the contact is detected and that passes through a proximity point representing the position where the proximity is detected, as the direction of said operating means in said xy coordinate system, and determining a position where said item is to be displayed in an area in a direction that originates from said contact point and that is different from the direction of said operating means; and establishing, in said xy coordinate system, a first division line passing through said contact point parallel to an x-axis of said xy coordinate system and a second division line passing through said contact point parallel to a y-axis of said xy coordinate system, thereby dividing said display range into four subranges, and determining the position where said item is to be displayed in one of said subranges which does not include said proximity point.

* * * * *